(12) United States Patent
Sano et al.

(10) Patent No.: US 10,439,964 B2
(45) Date of Patent: Oct. 8, 2019

(54) METHOD AND APPARATUS FOR PROVIDING A MESSAGING INTERFACE

(75) Inventors: Hitoshi Sano, Westford, MA (US);
Sangita Shah, Kendall Park, NJ (US);
Stephen Janiak, Cambridge, MA (US);
Premal Pankaj Jhaveri, Mumbai (IN);
Natalie Jhaveri, Montreal (CA);
Patrick Arsenault, Montreal (CA);
Teresa Hunkeler, Montreal (CA)

(73) Assignee: Nokia Technologies Oy, Espoo (FI)

( * ) Notice: Subject to any disclaimer, the term of this patent is extended or adjusted under 35 U.S.C. 154(b) by 1537 days.

(21) Appl. No.: 13/642,799

(22) PCT Filed: Apr. 4, 2011
(Under 37 CFR 1.47)

(86) PCT No.: PCT/FI2011/050286
§ 371 (c)(1),
(2), (4) Date: May 2, 2014

(87) PCT Pub. No.: WO2011/131829
PCT Pub. Date: Oct. 27, 2011

(65) Prior Publication Data
US 2015/0046838 A1  Feb. 12, 2015

(30) Foreign Application Priority Data

Apr. 22, 2010 (IN) .......................... 1138/CHE/2010

(51) Int. Cl.
*G06Q 50/00* (2012.01)
*G06F 3/0482* (2013.01)
(Continued)

(52) U.S. Cl.
CPC .......... *H04L 51/046* (2013.01); *G06F 3/0482* (2013.01); *G06F 3/0488* (2013.01);
(Continued)

(58) Field of Classification Search
CPC ............................ H04N 5/232; G06Q 300/02
(Continued)

(56) References Cited

U.S. PATENT DOCUMENTS 7,120,455 B1    10/2006 Chen et al.
2005/0086612 A1 *  4/2005 Gettman ............. G06F 3/04815
                                           715/848
(Continued)

FOREIGN PATENT DOCUMENTS

WO    2006/014603 A2    2/2006
WO    20060014603 A2    2/2006

OTHER PUBLICATIONS

Indian Office Action for related Indian Patent Application No. 1138/CHE/2010 dated Jan. 6, 2017, 7 Pages.

*Primary Examiner* — Cao H Nguyen
(74) *Attorney, Agent, or Firm* — Ditthavong & Steiner, P.C.

(57) ABSTRACT

An approach is presented for interacting with a messaging user interface. A presentation is caused, at least in part, of a messaging user interface associated with one or more messaging services at a device. Presentation of a user interface element providing a link to one or more communications sessions corresponding to the messaging services is caused, at least in part. Selection of the user interface element causes, at least in part, presentation of representations of the communications sessions as one or more overlay elements on the user interface.

20 Claims, 14 Drawing Sheets

(51) Int. Cl.
*G06F 3/0484* (2013.01)
*H04L 12/58* (2006.01)
*G06F 3/0488* (2013.01)
*H04L 12/18* (2006.01)

(52) U.S. Cl.
CPC ......... *G06F 3/04842* (2013.01); *G06Q 50/01* (2013.01); *H04L 12/1827* (2013.01)

(58) Field of Classification Search
USPC .................. 715/758, 752, 760, 748, 785
See application file for complete search history.

(56) References Cited

U.S. PATENT DOCUMENTS

| | | | |
|---|---|---|---|
| 2006/0277460 A1* | 12/2006 | Forstall | G06F 17/30905 715/234 |
| 2006/0277481 A1* | 12/2006 | Forstall | G06F 17/30899 715/764 |
| 2008/0055269 A1* | 3/2008 | Lemay | G06F 3/0482 345/173 |
| 2008/0307308 A1* | 12/2008 | Sullivan | G06F 17/30905 715/723 |
| 2009/0228807 A1 | 9/2009 | Lemay | |
| 2009/0280843 A1* | 11/2009 | Wisebourt | H04L 51/043 455/466 |
| 2011/0161866 A1* | 6/2011 | Rainisto | G06F 3/0485 715/785 |
| 2012/0198324 A1* | 8/2012 | Mahajan | G06F 17/3089 715/230 |
| 2013/0205220 A1* | 8/2013 | Yerli | H04L 67/36 715/748 |

* cited by examiner

METHOD AND APPARATUS FOR PROVIDING A MESSAGING INTERFACE

BACKGROUND

Service providers and device manufacturers (e.g., wireless, cellular, etc.) are continually challenged to deliver value and convenience to consumers by, for example, providing compelling network services. One area of interest has been the development of messaging related services (e.g., chat services, instant messaging services, etc.) which enjoy great popularity among users. This popularity has led to a proliferation of such services from a variety of service providers (e.g., Nokia®, Yahoo!®, Google®, AOL®, etc.). Moreover, it is noted that users often have multiple accounts across multiple service providers that can be used for different purposes (e.g., work, home, etc.) and with different groups (e.g., family, friends, etc.). Accordingly, service providers and device manufacturers face significant technical challenges to enabling users to efficiently and quickly navigate among multiple conversation threads, messages, etc. active within the multiple messaging services and accounts on a common device. The technical challenges are particularly difficult when the user's device has limited input/output capabilities (e.g., a touch-enabled mobile device) and/or when the services are to remain separate and distinct.

SOME EXAMPLE EMBODIMENTS

Therefore, there is a need for an approach for interacting with a messaging user interface.

According to one embodiment, a method comprises causing, at least in part, presentation of a messaging user interface associated with one or more messaging services at a device. The method also comprises causing, at least in part, presentation of a user interface element providing a link to one or more communications sessions corresponding to the messaging services. Selection of the user interface element causes, at least in part, presentation of representations of the communications sessions as one or more overlay elements on the user interface.

According to another embodiment, an apparatus comprising at least one processor, and at least one memory including computer program code, the at least one memory and the computer program code configured to, with the at least one processor, cause, at least in part, the apparatus to cause, presentation of a messaging user interface associated with one or more messaging services at a device. The apparatus is also caused to present a user interface element providing a link to one or more communications sessions corresponding to the messaging services. Selection of the user interface element causes, at least in part, presentation of representations of the communications sessions as one or more overlay elements on the user interface.

According to another embodiment, a computer-readable storage medium carrying one or more sequences of one or more instructions which, when executed by one or more processors, cause, at least in part, an apparatus to cause, presentation of a messaging user interface associated with one or more messaging services at a device. The apparatus is also caused to present a user interface element providing a link to one or more communications sessions corresponding to the messaging services. Selection of the user interface element causes, at least in part, presentation of representations of the communications sessions as one or more overlay elements on the user interface.

According to another embodiment, an apparatus comprises means for causing, at least in part, presentation of a messaging user interface associated with one or more messaging services at a device. The apparatus also comprises means for causing, at least in part, presentation of a user interface element providing a link to one or more communications sessions corresponding to the messaging services. Selection of the user interface element causes, at least in part, presentation of representations of the communications sessions as one or more overlay elements on the user interface.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a messaging interface are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
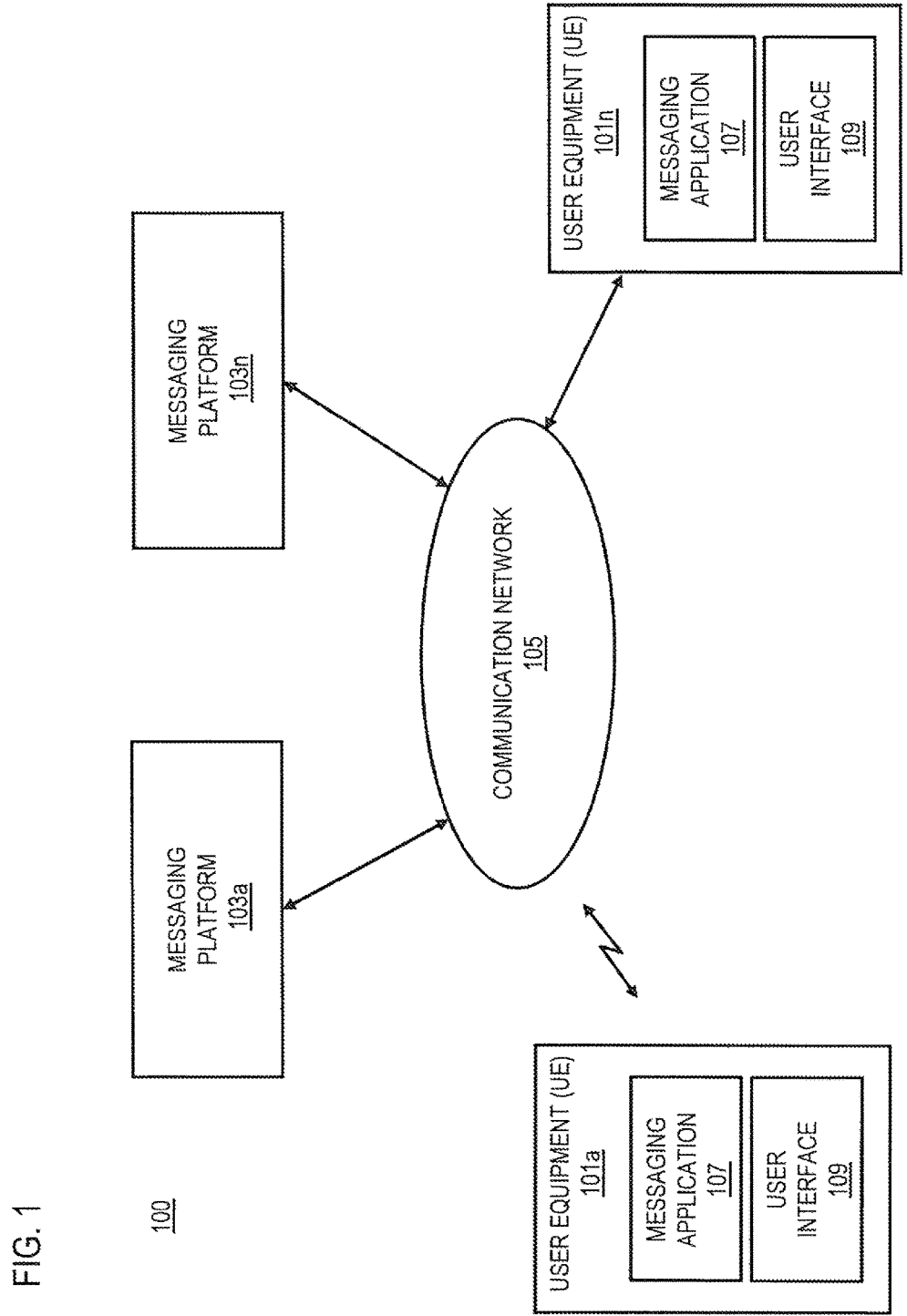
FIG. 1 is a diagram of a system capable of presenting a touch enabled messaging user interface, according to one embodiment.

FIG. 1 is a diagram of a system capable of presenting a touch enabled messaging user interface, according to one embodiment. In recent times, messaging services have become ubiquitous as users of devices increasingly seek the ability to contact and communicate with other users. A trend in these devices has been the increase in hardware capabilities, such as the manufacture and use of touch enabled hardware such as touch screen. Touch enabled hardware can enable a person to interact with what is displayed directly by touching the screen with the person's hand, finger, etc. rather than with an indirect input such as a mouse or touchpad. Different types of touch enabled hardware further include the use of an intermediate device such as a stylus. However, the use of an intermediate device is not required in touch enabled hardware. Examples of touch screen technology include resistive, surface acoustic wave, and capacitive touch screen technologies.

The use and availability of touch enabled hardware generates new and complex problems and technical difficulties in presenting services to users. One such service includes messaging services. In the past, different messaging services have been presented using different messaging applications. Some messaging applications allow for the presentation of multiple messaging capabilities, however, these messaging applications do not take into account technical difficulties of presenting various messaging services via touch enabled hardware. In cases where the devices are mobile devices and/or include a screen with a limited viewing area, small text and icons are utilized to allow for a greater amount of content. However, these approaches to present a large amount of messaging information in a limited screen do not account for technical parameters associated with touch enabled devices. For example, it is technically difficult to accurately pinpoint what a user wishes to select if an area for selection is small.

Further, with the use of multiple messaging services, navigating to new or active messages quickly and efficiently (e.g., with little navigation input) becomes difficult. As such, technical difficulties arise in the presentation and use of navigation controls and features. These difficulties can include limited viewing space on a screen of a device limiting the available presentation viewing area that may be allotted for presenting one or more navigation controls.

To address this problem, a system 100 of FIG. 1 introduces the capability to present a touch enabled messaging user interface, according to one embodiment. User equipment (UEs) 101a-101n can communicate with other UEs 101 and messaging platforms 103a-103n via a communication network 105. Messages can travel from one UE 101a to another UE 101n via a peer-to-peer connection or via one of the messaging platforms 103. A messaging application 107 on the UE 101 can be utilized to send and receive the messages. Further, a user interface 109 of the UE 101 may present messages and other information associated with the messaging application 107 and receives input. The UE 101 may include touch enabled hardware that allows interaction via the user interface 109. Moreover, the messaging application 107 can be associated with one or more messaging services. Many users of messaging services today use more than one different type of messaging service. For example, a user may use a Nokia Ovi Messaging™, an AOL Instant Messenger™, Yahoo Instant Messenger™, Google Talk™, Windows Live Messenger™, etc. Further, the user may associate one or more of the different types of messenger services to different types of friends or colleagues. For example, the user may use a first messaging service when communicating with a group of college friends and a second messaging service for communicating with work colleagues.

With the various types of messaging services, various types of network and communication services and hardware may be utilized. As such, the various messaging services may include one or more different networking layouts and/or schemes. In one example, these layouts may include one or more gateways and/or servers between the messaging platform 103 the UEs 101. These gateways may be included as part of the communication network 105 and may be utilized for protocol adaptation and/or translation and/or network traffic related data collection and/or billing.

Because users utilize multiple different types of services, it would be advantageous for the messaging application 107 to present messages associated with each type of service. However, as noted above, when presenting messages to various services, it can be difficult to navigate between communications sessions of a messaging service and/or communications sessions between messaging services. The user of the UE 101 may select a group of messaging services to utilize using a user interface (e.g., the user interface of FIG. 5). In certain embodiments, a communication session is can be a messaging session or chat session between the user of one UE 101a and another party associated with another UE 101n. A chat session can include one or more messages between the user and the other party. Further, the chat session may include identifiers associated with the user and/or other party. Moreover, in certain scenarios, chat sessions can include one or more other parties associated with other UEs 101. As such, messages are transmitted and received from multiple other parties. A presentation of a chat session may further include one or more previous messages between the parties.

Figure 6A:
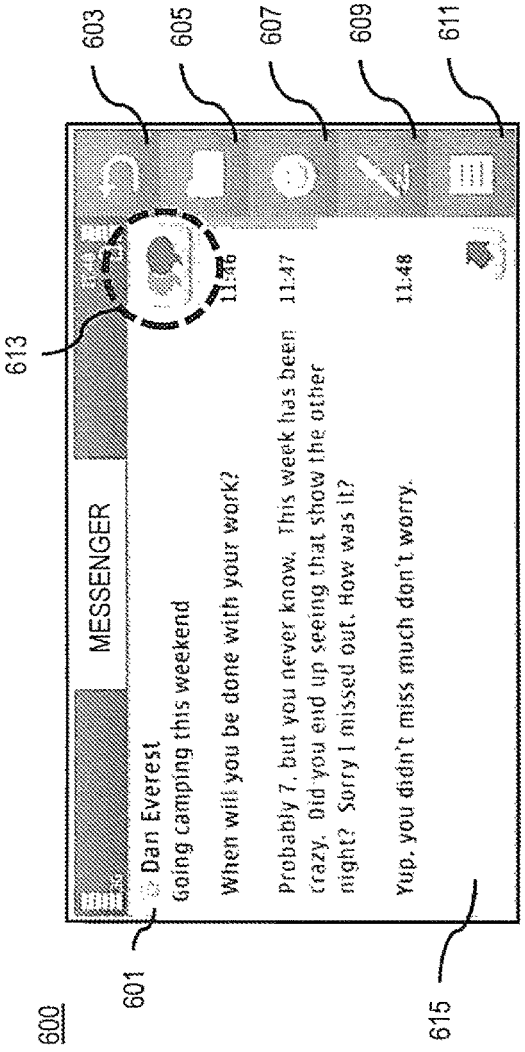
FIGS. 6A-6C, 7A-7B, 8A-8C, and 9 are diagrams of user interfaces utilized in the processes of FIGS. 3 and 4, according to various embodiments.

Further, when executing, the messaging application 107 can cause, at least in part, presentation of a messaging user interface associated with one or more of the messaging services. In one embodiment, one of the services is presented on the user interface 109. The presentation may include one or more features associated with the service. For example, the presentation may include an ongoing chat session as shown in FIG. 6A, one or more contacts lists, etc. Further, the user interface 109 may include presentation of a user interface element providing a link to one or more communications sessions corresponding to the messaging services. An example of such a user interface element may be a chat bubble icon or other visual indicator that may represent the link to communications sessions. In certain scenarios, when a new message associated with one of the services is received, the user interface element is highlighted. Highlighting may include changing a contrast or color of the user interface element. Thus, the highlighting can be used to indicate that a new message is available. As such, colors contrasting with the other portions of the user interface 109 and/or colors associated with a particular meaning (e.g., colors such as orange, red, green, yellow, etc.) may be used to indicate that the new message is available. Moreover, the coloring may be persistent until the new message is viewed. If more than one unread message is received, the user interface element can be highlighted until each one is viewed.

Additionally, the user interface element, when selected (e.g., via a touch enabled input), may cause presentation of representations of communications sessions. The presentation of the representations of the communications sessions can include one or more overlay elements. These overlay elements can be interactive (e.g., selectable on a touch enabled interface). Examples of the overlay element representations of communications sessions include one or more identifiers (e.g., a name, alias, avatar picture, etc.) of a party associated with the communication session. Further, the overlay element may include a preview of one or more messages sent and/or received via the communication session. Moreover, when a message associated with one of the overlay elements is received, the overlay element may be highlighted to represent that an associated unread message is available.

In certain embodiments, the overlay elements are only associated with communications sessions associated with the messaging service currently in focus. In other embodiments, the overlay elements presented are associated with any active communication session ongoing in any of the messaging services. When an overlay element is selected, an interface of the communication session represented by the overlay element is caused, at least in part, to be presented. The presentation of the communication session may include one or more historical messages associated with the communication session.

With this approach, the user can quickly and easily navigate to a message via two inputs. For example, the first input may be to select the user interface element to cause presentation of the overlay elements. The second input may include selection of one of the overlay elements to quickly and efficiently present the user interface associated with that overlay element.

As noted previously, the presentation of the user interface 109 can be focused on one of the messaging services. When a message is received corresponding to one of the communications sessions, the messaging application 107 can determine whether the message is associated with the messaging session in focus. If the message is associated with a different messaging service (e.g., a messaging service active in the background of the messaging application 107), a presentation is caused of a user interface element providing a link to the different messaging service. The link to the different messaging service, when activated, may cause presentation of the communication session corresponding to the message and/or cause presentation of another interface associated with the different messaging service. Moreover, the user interface element can include an obscured visual indicator associated with the different messaging service. The obscured visual indicator can include a peel away of a part of the user interface 109 to show the obscured visual indicator. An example of such an obscured visual indicator is detailed in FIG. 7B.

When messages associated with other messaging services are received, the most recent messaging service can presented via the obscured visual indicator. When the obscured visual indicator is selected and a corresponding user interface 109 presented, a visual indicator associated with the next most recently received message can be presented. This visual indicator may additionally be obscured and associated with yet another messaging service. Obscuring of the visual indicator has the benefit of separating messaging services from being viewed simultaneously. For example, one service provider may not wish to have a user interface presentation associated with the service provider to additionally include a competitor's trademark, icon, etc.

Figure 8A:
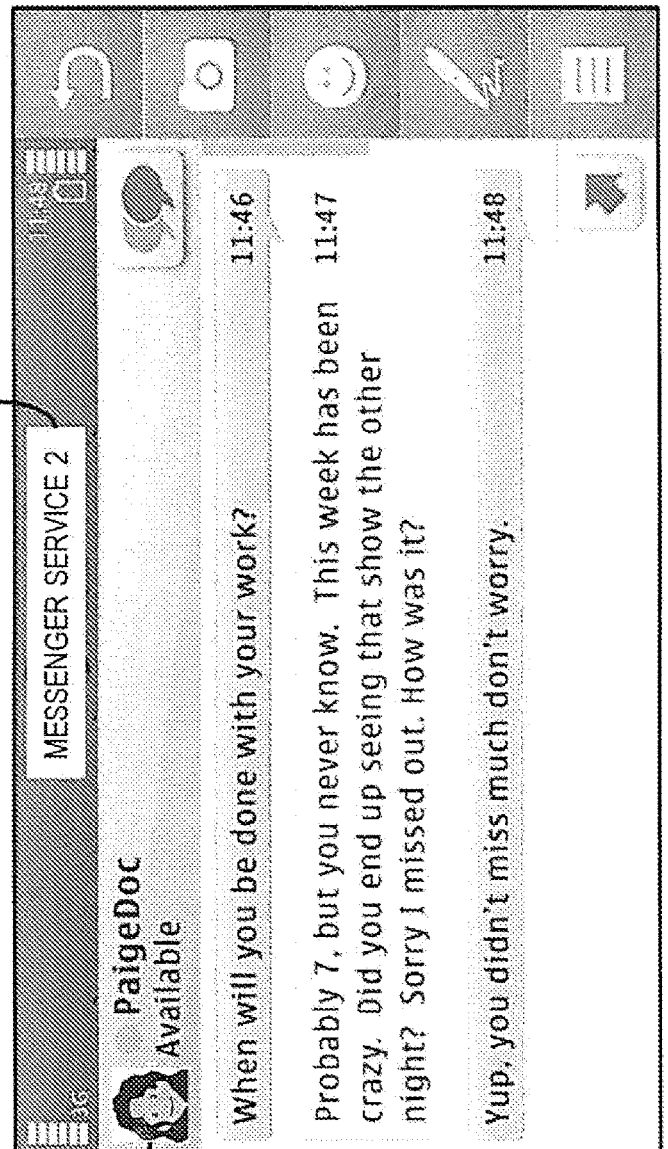
Figure 8C:
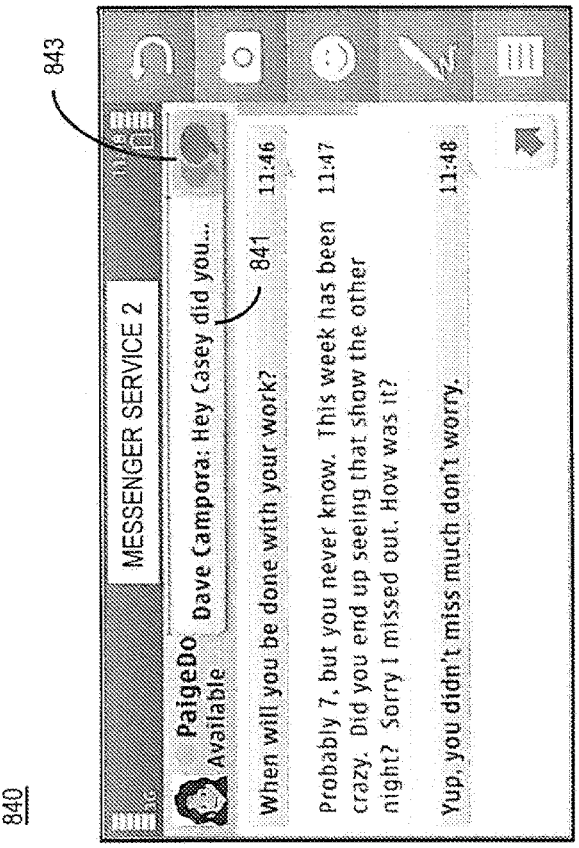
Figure 8B:
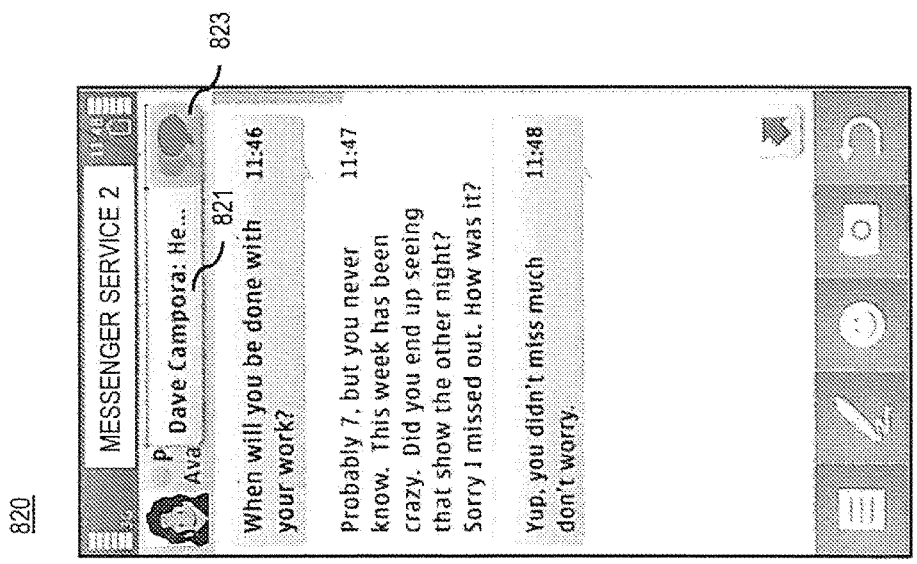
Figure 9:
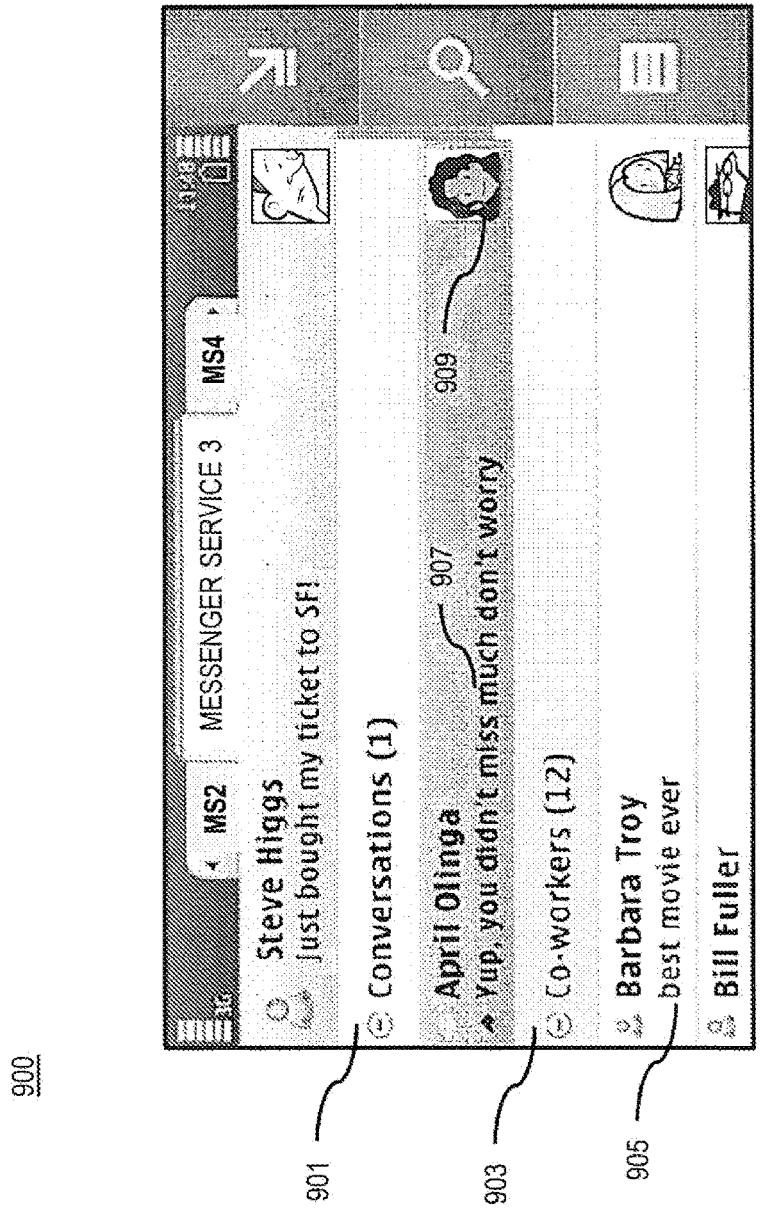

Further, as detailed in the user interface of FIG. 9, when a message is received, a preview of the message may be displayed in a contact list. Moreover, the most recent message associated with each contact may further be presented to the user. Additionally, when a new message is received, the user interface 109 can present a sliding animation as detailed in FIGS. 8A-8C showing a preview of the received message.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), audio/video player, digital camera/camcorder, positioning device, television receiver, radio broadcast receiver, electronic book device, game device, or any combination thereof. It is also contemplated that the UE 101 can support any type of interface to the user (such as "wearable" circuitry, etc.).

By way of example, the UE 101s, and messaging platforms 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the messaging platform 103 may interact according to a client-server model with the messaging application 107. According to the client-server model, a client process sends a message including a request to a server process, and the server process responds by providing a service (e.g., messaging services). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
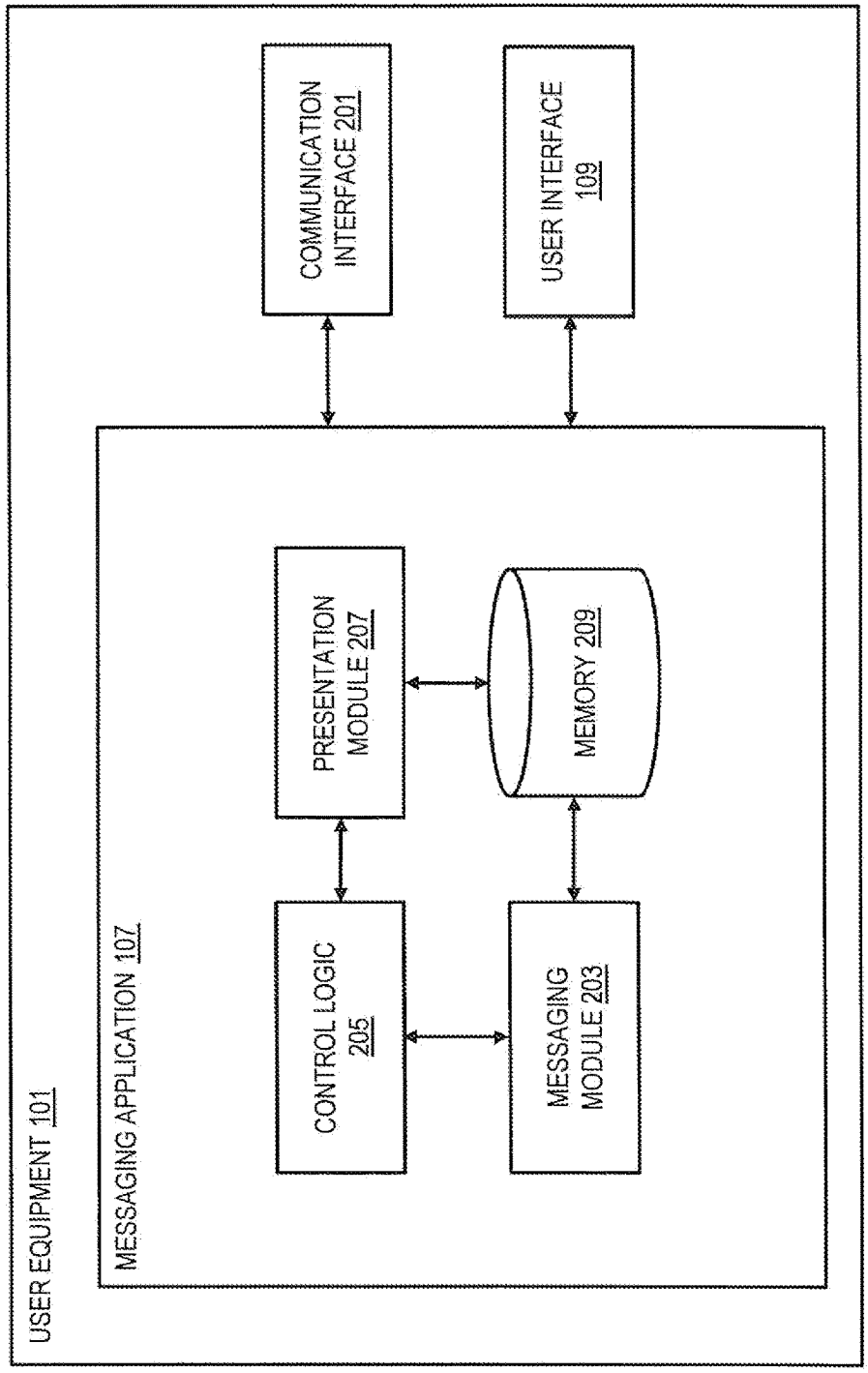
FIG. 2 is a diagram of the components of user equipment, according to one embodiment.

FIG. 2 is a diagram of the components of user equipment, according to one embodiment. By way of example, the UE 101 includes one or more components for causing presentation of a touch enabled messaging interface. It is contemplated that the functions of these components may be combined in one or more components or performed by other components of equivalent functionality. In this embodiment, the UE 101 includes a communication interface 201, a user interface 109, and a messaging application 107 that includes a messaging module 203, control logic 205, a presentation module 207, and memory 209.

In one embodiment, the communication interface 201 can be used to communicate with a messaging platform 103 or other UEs 101. Certain communications can be via methods such as an internet protocol, cellular messaging (e.g., SMS, MMS, etc.), or any other communication method (e.g., via the communication network 105). In some examples, the UE 101 can send a message to another UE 101 via the communication interface 201. The message can be sent first to the messaging platform 103 or directly to the UE 101. In certain embodiments, the messaging platform 103 is utilized to track the location of UEs 101 (e.g., via a login) to provide the communication interface 201 with a means to directly communicate with users of other UEs 101.

The user interface 109 can include various methods of communication. For example, the user interface 109 can have outputs including a visual component (e.g., a screen), an audio component, a physical component (e.g., vibrations), and other methods of communication. User inputs can include a touch-screen interface, a scroll-and-click interface, a button interface, a microphone, combinations thereof, etc. Moreover, the user interface 109 may be used to display messages as well as messaging interfaces. Exemplary messaging interfaces are shown in FIGS. 6A-6C, 7A-7B, 8A-8C and 9. The user interface 109 may further include various types of input for navigating messages and generating messages. The input can be via one or more methods such as voice input, textual input, typed input, typed touch-screen input, other touch-enabled input, etc.

The control logic 205 can use the messaging module 203 to control the communication interface 201 and the presentation module 207 to determine presentations via the user interface 109. The messaging module 203 can further control multiple different types of available messaging services. In certain embodiments, a messaging service is available if the messaging service is active or available for use and/or can receive messages. When a message is received via the communication interface 201, the messaging module 203 determines which messaging service is associated with the message. Further, the message may be stored in memory 209. The messaging module 203 can then determine a presentation action to associate with the received message. For example, in certain embodiments, if it is determined that a user interface 109 being presented includes focus of a messaging service and the message belongs to that service, a highlight of a user interface element (e.g., a chat bubble) can be presented. In another embodiment, if it is determined that the messaging service in focus is different from a messaging service associated with the message, then another visual indicator may be used to present notification of the message.

Figure 3:
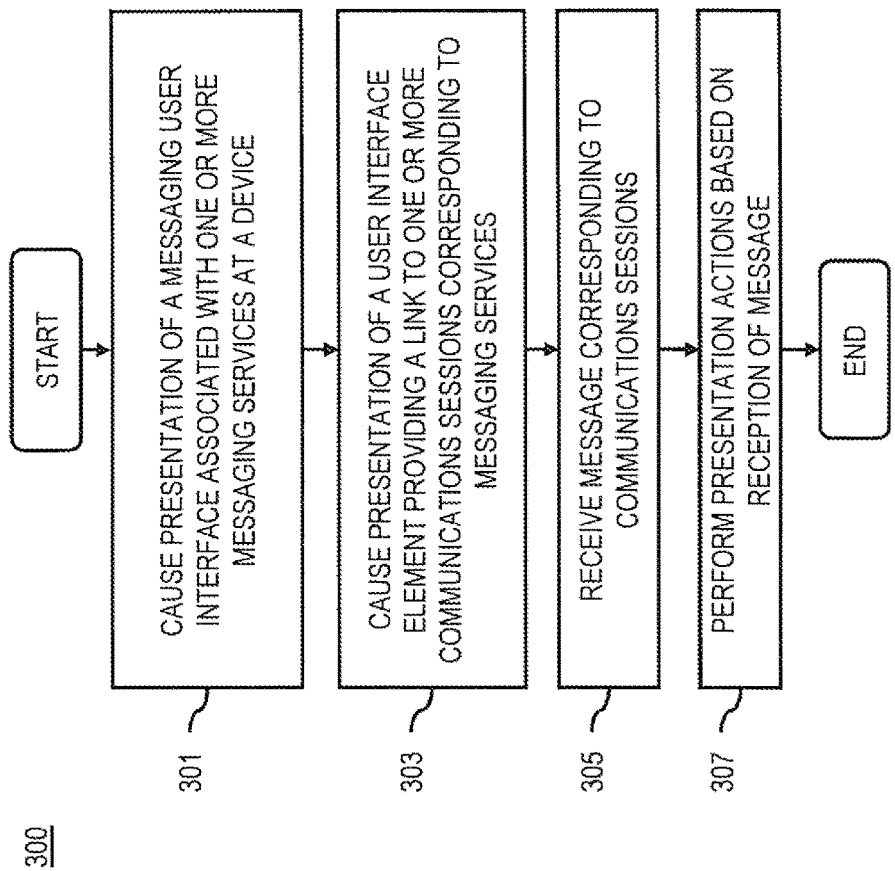
FIG. 3 is a flowchart of a process for presenting a touch enabled messaging user interface, according to one embodiment.
Figure 11:
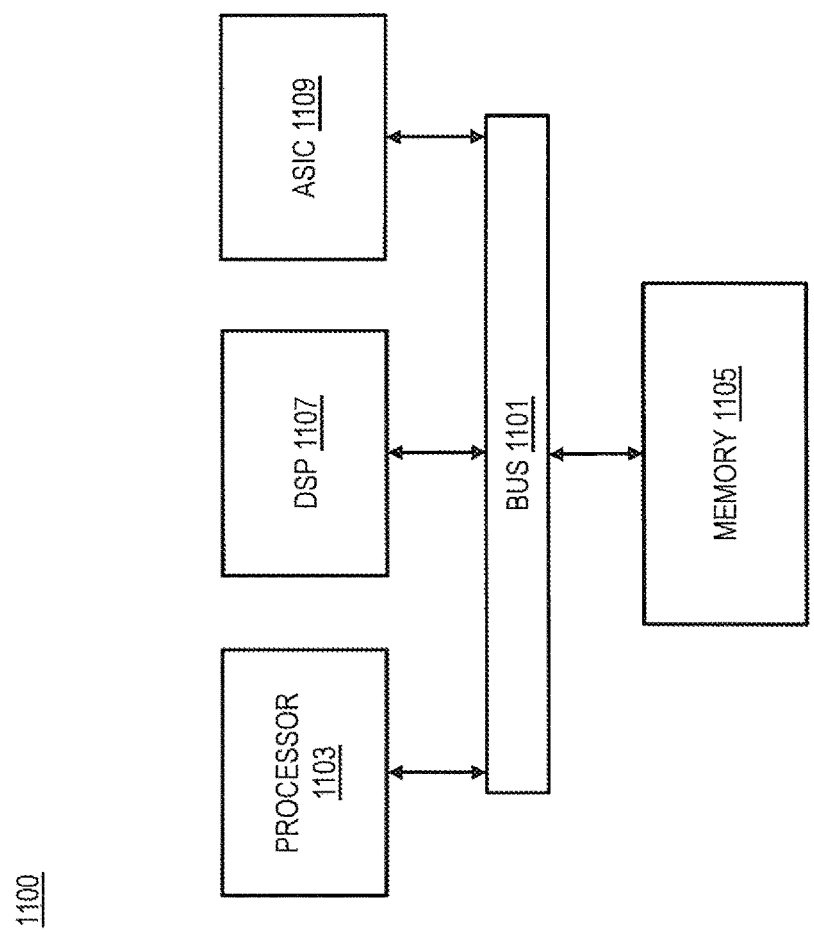
FIG. 11 is a diagram of a chip set that can be used to implement an embodiment of the invention.

FIG. 3 is a flowchart of a process for presenting a touch enabled messaging user interface, according to one embodiment. In one embodiment, the messaging application 107 of a UE 101 performs the process 300 and is implemented in, for instance, a chip set including a processor and a memory as shown in FIG. 11. As such, the messaging application 107, its components, and/or other components of the UE 101 can provide means for accomplishing various parts of the process 300 as well as means for accomplishing other processes.

At step 301, the messaging application 107 causes, at least in part, presentation of a messaging user interface 109 associated with one or more messaging services at the UE 101. The presentation can include a view of features associated with one of the messaging services. For example, a view can include a contacts list of online and/or offline contacts associated with one of the messaging services, a presentation of a communication chat session between the user and one or more other users of other UEs 101, a chat session history, other messaging features, or a combination thereof.

Next, at step 303, the messaging application 107 causes, at least in part, presentation of a user interface element that provides a link to one or more communications sessions corresponding to the messaging services. The selection of the user interface element can cause, at least in part, presentation of representations of the communications sessions as one or more overlay elements on the user interface 109. Further interactions associated with the user interface element are detailed in the processes of FIG. 4.

The messaging application 107 can receive a message corresponding to one of the communications sessions (step 305). The messaging application 107 can then determine a messaging service that the received message is associated with. Based on this determination and one or more other criteria, the messaging application 107 performs one or more presentation actions (step 307). The criteria can include one or more rules for presentation based on user preferences, contracting rules (e.g., based on agreements of a developer of the messaging application 107 and the service providers), etc.

In one embodiment, the presentation action includes highlighting of the user interface element based on the reception of the message. Highlighting of the user interface element may include changing the coloring of the user interface element or otherwise bringing attention to the user interface element. As previously noted, the user interface element may be in the form of a visual indicator such as an icon, a chat bubble, etc.

In another embodiment, the presentation action includes presentation of another user interface element. In this embodiment, the presentation of the messaging user interface 109 is focused on one of the messaging services. A focus on the messaging service can be presenting a communication session associated with the messaging service, presenting a contact list associated with the messaging service, etc. Then, the messaging application 107 determines that the message is associated with another one of the messaging services. The determination can be made depending on a communication method (e.g., using assigned communication ports and/or addresses) used in sending and/or receiving the message, a header of the message (e.g., specifying the messaging service), protocols used to receive the message (e.g., Extensible Messaging and Presence Protocol), or another means for associating a message with a messaging service. Then, the messaging application 107 causes, at least in part, presentation of another user interface element providing a link to the other one of the messaging services. The other user interface element may include an obscured visual indicator associated with the other one of the messaging services. An example of such an obscured visual indicator (e.g., text lettering, an icon, a trademark, etc.) is detailed in the description of FIG. 7B. As noted previously the obscuring can be a peeling of another user interface portion to show the visual indicator. Moreover, the peeling may be an animation that occurs based, at least in part, on the reception of the message. Additionally or alternatively, the type of obscuring and/or the need for obscuring can be based on the above recited criteria.

Further, the other user interface element can be an interactive user interface element. In certain embodiments, the UE 101 is a touch enabled device and the user may touch a screen presenting the user interface 109 to interact with the other user interface element and/or other interactive user interface elements. The messaging application 107, via the user interface 109 receives a touch enabled input selecting the other user interface element. The input selection causes presentation of another messaging interface associated with the other one of the messaging services. For example, the other messaging interface may include a contacts or active conversation menu or list. Further, in some scenarios, the other messaging interface may include a communication session user interface associated with the message.

In one embodiment, the presentation action includes a preview of the message. An example of a preview of the message is provided in FIGS. 8A, 8B, and 9. In one scenario, the presented messaging user interface 109 is associated with a contacts list. In this contacts list, user interface elements respectively associated with each contact may be utilized to display the preview. Further, when a new message is received, the user interface element associated with the contact can be highlighted. Moreover, this highlighting may persist until the message and/or messaging communication session associated with the message has been displayed. The user may additionally select the respective user interface elements to activate an action. In one example, the action may include presentation of a user interface associated with a communication session between the user and the selected contact.

Figure 4:
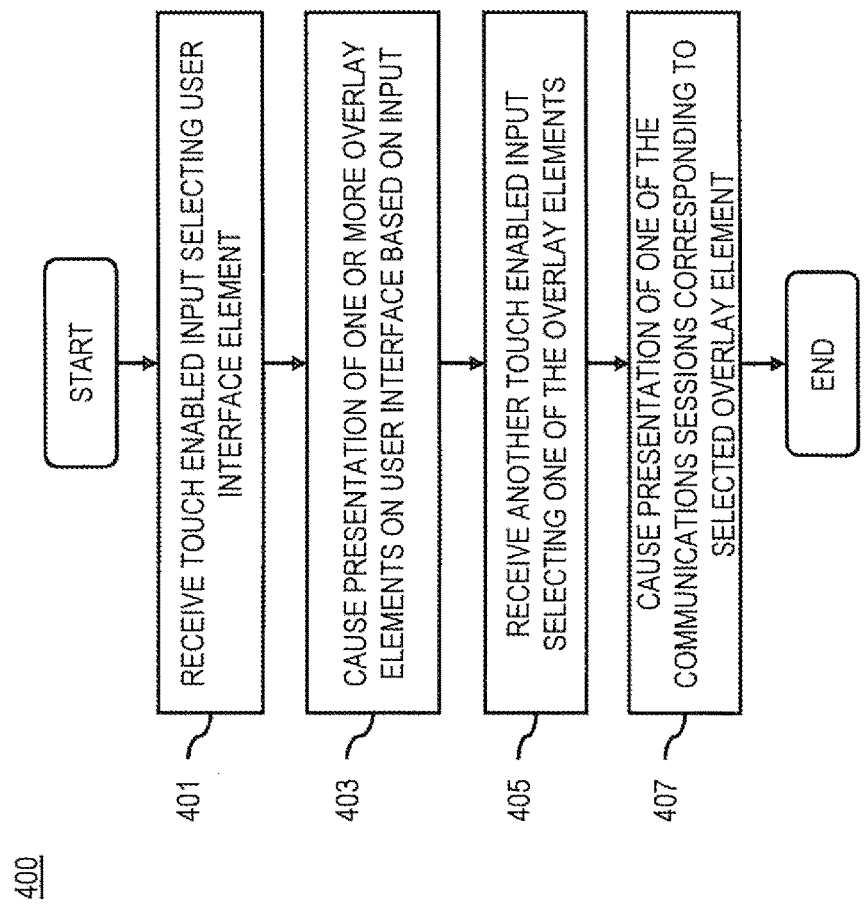
FIG. 4 is a flowchart of a process for interacting with a touch enabled messaging user interface, according to one embodiment.

FIG. 4 is a flowchart of a process for interacting with a touch enabled messaging user interface, according to one embodiment. In one embodiment, the messaging application 107 performs the process 400 and is implemented in, for instance, a chip set including a processor and a memory as shown in FIG. 11. As such, the messaging application 107, its components, and/or other components of the UE 101 can provide means for accomplishing various parts of the process 400 as well as means for accomplishing other processes. A user interface 109 of the messaging application 107 can be presented. Further, as described in FIG. 3, a presentation of a user interface element providing a link to one or more communications sessions corresponding to messaging services is caused on the user interface 109.

At step 401, the messaging application 107 receives a touch enabled input selecting the user interface element. In certain embodiments another type of input may be utilized. Based on the selection of the user interface element (e.g., a chat bubble icon), at step 403, the messaging application 107 causes, at least in part, presentation of representations of the communications as one or more overlay elements on the user interface based, at least in part, on the touch enabled selection input. Further, when a new message is received by the messaging application 107, an overlay element corresponding to the communication session can be caused to be highlighted. This highlight can be used to represent that a new and/or unread message is associated with a communication session associated with the overlay element. The overlay elements may additionally be touch enabled and/or selectable by a user.

The messaging application 107 receives another touch enabled input selecting one of the overlay elements (step 405). Then the messaging application 107 causes, at least in part, presentation of one of the communications sessions corresponding to the selected overlay element (step 407). The communication session can include messages sent to and received from one or more contacts associated with the overlay element and/or message.

Figure 5:
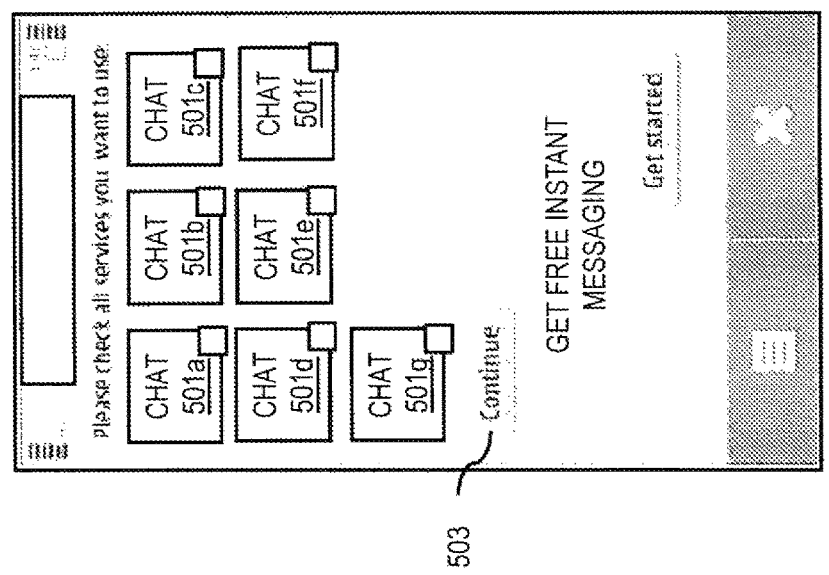
FIG. 5 is a diagram of a touch enabled user interface associated with a messaging application, according to various embodiments.

FIG. 5 is a diagram of a touch enabled user interface associated with a messaging application, according to various embodiments. The user interface 500 displays options selecting one or more chat messaging services 501a-501g. When the user selects the messaging services, the user may select a continuation button 503 to enter account information associated with each service. In certain embodiments, account information can be saved in a memory associated with the messaging application 107. Further, if the user does not have an account for one or more of the services, the user can be prompted to register for an account. One or more accounts can be registered for each messaging service 501. Each of the messaging services and/or messaging accounts may be presented to the user via one or more messaging user interfaces 109.

FIGS. 6A-6C, 7A-7B, 8A-8C, and 9 are diagrams of user interfaces utilized in the processes of FIGS. 3 and 4, according to various embodiments. In FIG. 6A, a user interface 600 is shown of a messaging application 107 on a UE 101. The user interface 600 shows a view of a chat session between the user and another user 601. The user interface 600 additionally shows user options such as a back user interface element 603, a save user interface element 605 (e.g., to save a received image message), an insert emotion user interface element 607, add quick text user interface element 609, and open options user interface element 611. Each of these user interface elements 603, 605, 607, 609, 611 may be interactively selected (e.g., via a touch screen input) to present an additional menu (e.g., another full screen presentation and/or an overlay) of options. Further, the user interface 600 can include a user interface element 613 that can be used to cause presentation of representations of communications sessions as an overlay element when selected. Moreover, the user interface 600 may include one or more fields 615 for entering text and/or other messages (e.g., images).

Figure 6B:
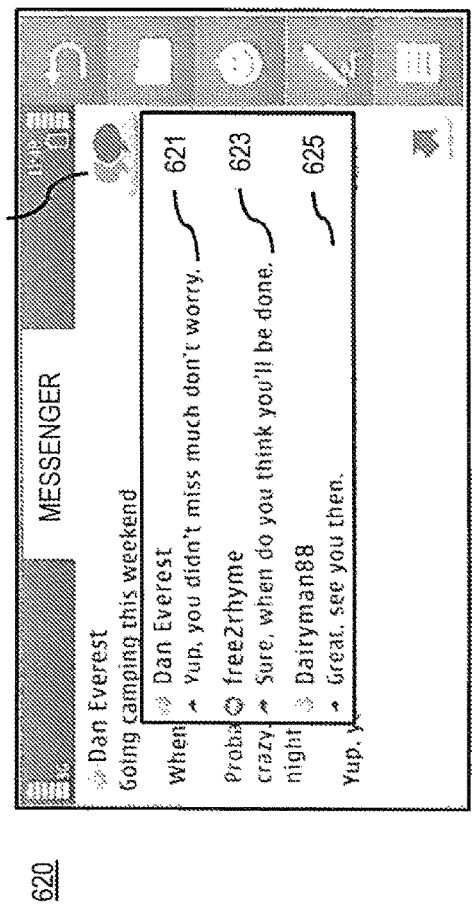

FIG. 6B shows a user interface 620 including the user interface element 613 that can cause presentation of representations 621, 623, 625 of communications sessions. The representations 621, 623, 625 may include one or more identifiers (e.g., a name, an avatar icon, etc.) of the other party to the communication session, presence information (e.g., the other party is away, busy, offline, etc.), the last message sent and/or received in the communication session, a visual indicator associating a direction (e.g., incoming, outgoing) of the message, or other messaging information associated with a message and/or user. Further, the representations 621, 623, 625 can be overlay elements. These overlay elements can be selectable. For example, each of the overlay elements can have a certain predetermined area that can be selected (e.g., via a touch enabled input). When one of the representations is selected, the messaging application 107 can perform a presentation action according to a rule. For example, the rule may cause a selection of the overlay element to cause presentation of a communication session between the user and a user associated with the overlay element.

Figure 6C:
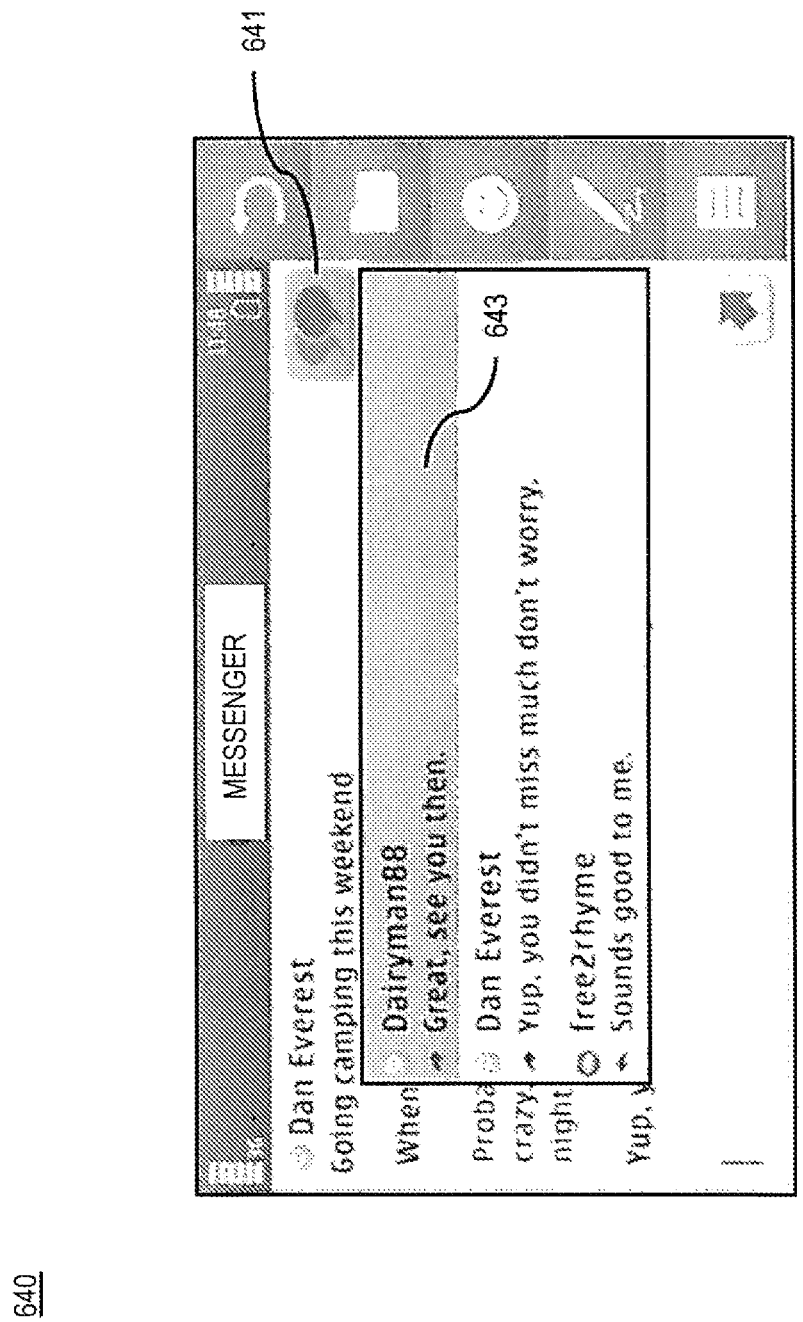

FIG. 6C shows a user interface 640 of the messaging application 107 after a new message is received, according to one embodiment. In this embodiment, the messaging application 107 determines that a new message is received. The messaging application 107 then associates the new message to a messaging service. In one scenario, the new message is associated with the messaging service presented on the user interface 640. The messaging application 107 then causes, at least in part, highlighting of a user interface element 641 based on the received message. The highlighting can function to cause alerting that the new message has been received. Further, when the user interface element 641 is selected, the presentation of overlay elements can additionally highlight an overlay element 643 associated with the new message. Moreover, the overlay element 643 can include a preview of the message. Additionally or alternatively, the overlay elements may be presented via a scrolling interface (not shown) or another interface to allow for the presentation of one or more additional overlay elements if screen space is limited. In this manner, a predetermined number (e.g., 3 in user interface 640) of overlay elements can be presented to the user out of a set of ongoing communications sessions. If the user wishes to view additional overlay elements associated with communications sessions, the user may provide input (e.g., scrolling) to view the additional overlay elements. An advantage of this interface is to allow for additional information to be presented to the user as well as to provide additional navigation options to the user.

Figure 7A:
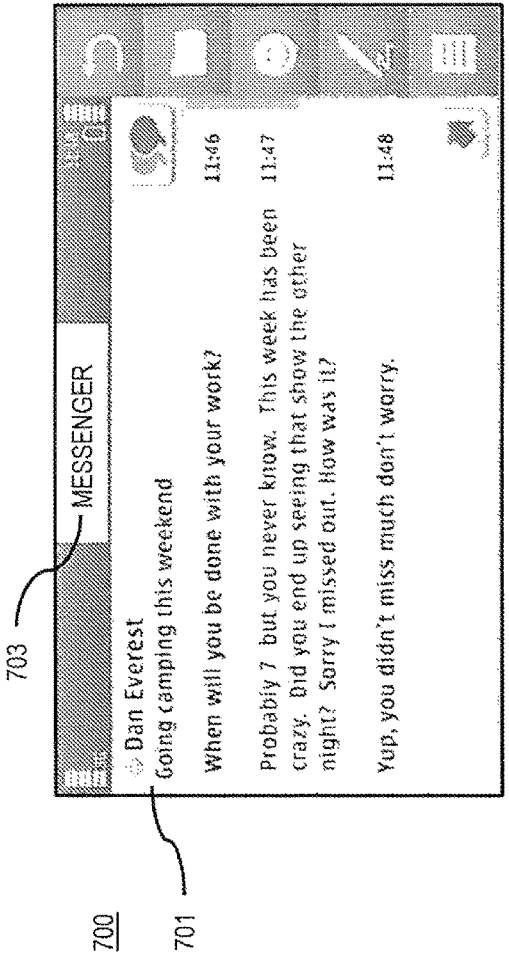
Figure 7B:
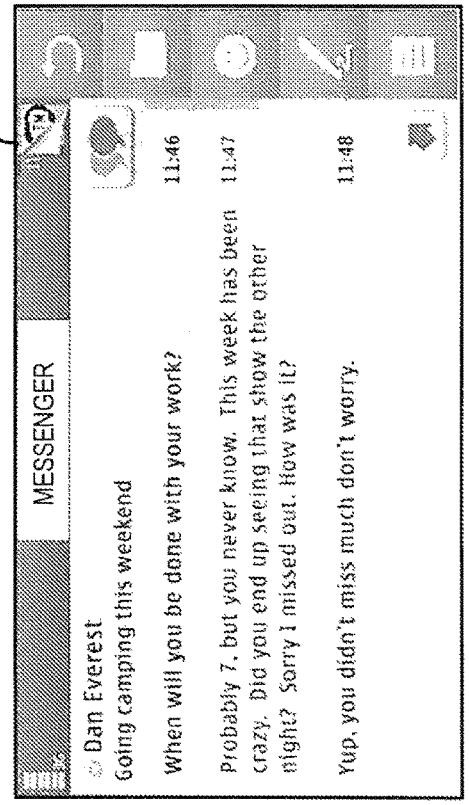

FIG. 7A displays a user interface 700 of a messaging application 107 in a communication session view. The communications between the user and a contact 701 on a first messaging service 703 are presented. A new message may be received by the messaging application 107 in a second messaging service not in focus. The messaging application 107 determines that the incoming message is associated with the second messaging service. Then, the messaging application 107, as shown in FIG. 7B shows a presents a visual indicator 721 of the second messaging service in the user interface 720. The visual indicator 721 may include an obscured icon, text, or other visual representation of the second messaging service. The obscuring can additionally include a peeling animation or presentation to show the visual indicator 721. An advantage to obscure the second messaging service is to maintain segregation between the different messaging interfaces and user feel and responsiveness associated with the respective messaging services. Further, service owners may additionally be more responsive to sharing presentation of a messaging user interface with other services if the services are less likely to be associated with each other and/or comingled. When the visual indicator 721 is selected, a presentation of the second messaging service can be shown. The presentation can include a contact list or other intermediate presentation of the second messaging service or a communication session with a contact associated with the received message. In certain embodiments, more than one message is received before selection of the visual indicator 721. If when a new message arrives from another messaging service, the other messaging service's visual indicator may be displayed. Further, if that visual indicator is selected and a presentation of the other messaging service is presented, the presentation can include the first visual indicator 721 associated with the message that has not yet been viewed. As such, the messaging application 107 can keep track of a queue of newly received messages and whether these messages should be presented via the peel visual indicator.

Additionally or alternatively, the visual indicator may additionally include a preview of the message (not shown). In this scenario, the peel away may be larger or variable in size. Moreover, selection and dragging of the peel away may be used to view the underlying visual indicator or message. In certain embodiments a selection based on tapping the user interface element and a dragging selection of the user interface element (e.g., the peel) can be distinguished and used for different functionality.

FIG. 8A shows a user interface 800 associated with a second messenger service 801. The user interface 800 may be between the user and one of the user's contacts 803. Further, a new message can be received in this view. The messaging application 107 can associate the message with the second messenger service 801. FIGS. 8B and 8C show respective portrait 820 and landscape 840 views of a presentation of a preview 821, 841 of the received message. The presentation can be caused based on a determination that the messaging service in focus is one of a set of messaging services and is the same messaging service as the messaging service associated with the message. The preview 821, 841 can additionally slide out and back in from a portion 823, 843 of the user interface 820, 840. The message preview 821, 841 may slide out in response to the reception of the message and slide back into the portion 823, 843 and out of view after a predetermined time (e.g., 3 seconds, 5 seconds, etc.). In certain scenarios, the preview 821, 841 can be persistent until the preview is selected. If the preview 821, 841 is selected, the preview 821, 841 causes presentation of a communication session between the user and the contact that sent the message. Moreover, as shown, an advantage of the preview 821, 841 is that the presentation of the preview 821, 841 can occur without obscuring any of the current chatting interface communications. This can be accomplished by allotting for a different section of the user interface 820, 840 to be obscured for viewing of the preview 821, 841 (e.g., the name of the contact). Further, if another message is received, the other message may be presented in place of the shown preview 821, 841. Moreover, if a timer is used for sliding back the preview 821, 841 into the portion 823, 843 of the user interface 820, 840, the timer may be reset or reset to another predetermined value. Optionally, when this timer lapses, the old preview may be presented.

FIG. 9 shows a contact list view of a user interface 900 of the messaging application 107. The contact list view is one of the possible views of the messaging application 107. The contacts can be sorted into currently active conversations 901 and/or other groups (e.g., co-workers 903). The presentation of contacts may include a status 905 of the contact and/or a recent communication 907 associated with the contact. In certain embodiments, only contacts with active communications show a recent message. Further, in certain embodiments, a status 905 is shown until a message associated with the user is received. When a new message is received during presentation of this contact view, the contact 909 associated with the message can be highlighted. This highlighting may be persistent until the message is viewed and/or a reply communication is sent. Further, the presentation of the recent communication 907 as a preview can allow the user to screen messages. For example, the user need not review a message in a full chat session view if the user sees the preview and determines that the user does not wish to further review the chat or send a reply. Moreover, when a message is short, the user need not activate a full chat session view to view the complete message.

In certain embodiments, messages between services can be treated similarly and not segregated. As such, the same or similar interface options can be used between different services as well as with a single service. Moreover, other multimodal interface options may be used to provide a cue that a new message is available (e.g., highlighting, audio such as beeps, vibration, etc.).

With the above approaches, presentation and interaction of messaging interfaces are improved. In a multi service messaging application 107, various navigation options are needed to be able to quickly view new messages and/or switch views to different communications sessions. As such, means for navigating via user interface elements is provided. Further, a user can use two inputs to navigate to another communication session from a particular view of a messaging service. This may be available for communications sessions associated with a single messaging service or communications sessions associated with different messaging services. Additionally, with the above approaches, because navigation options are quickly presented and available to the user, less processing time is needed for navigating between messages.

The processes described herein for interacting with a messaging user interface may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
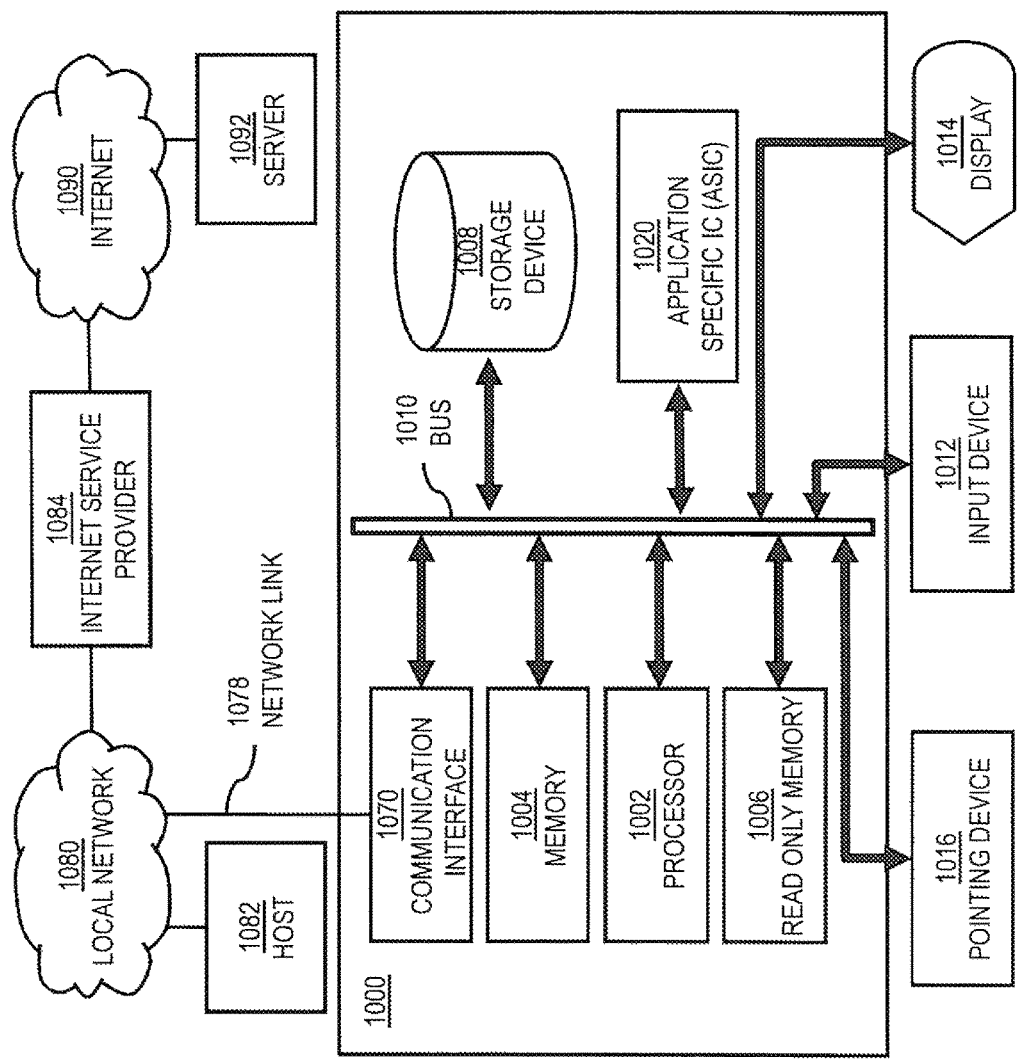
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to interact with a messaging user interface as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of interacting with a messaging user interface.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to interact with a messaging user interface. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for interacting with a messaging user interface. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for interacting with a messaging user interface, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 105 for the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to provide options to interact with a messaging user interface as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of services. Chip set or chip 1100, or a portion thereof, constitutes a means for performing one or more steps of interacting with a messaging user interface.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to interact with a messaging user interface. The memory 1105 also stores the data associated with or generated by the execution of the inventive steps.

Figure 12:
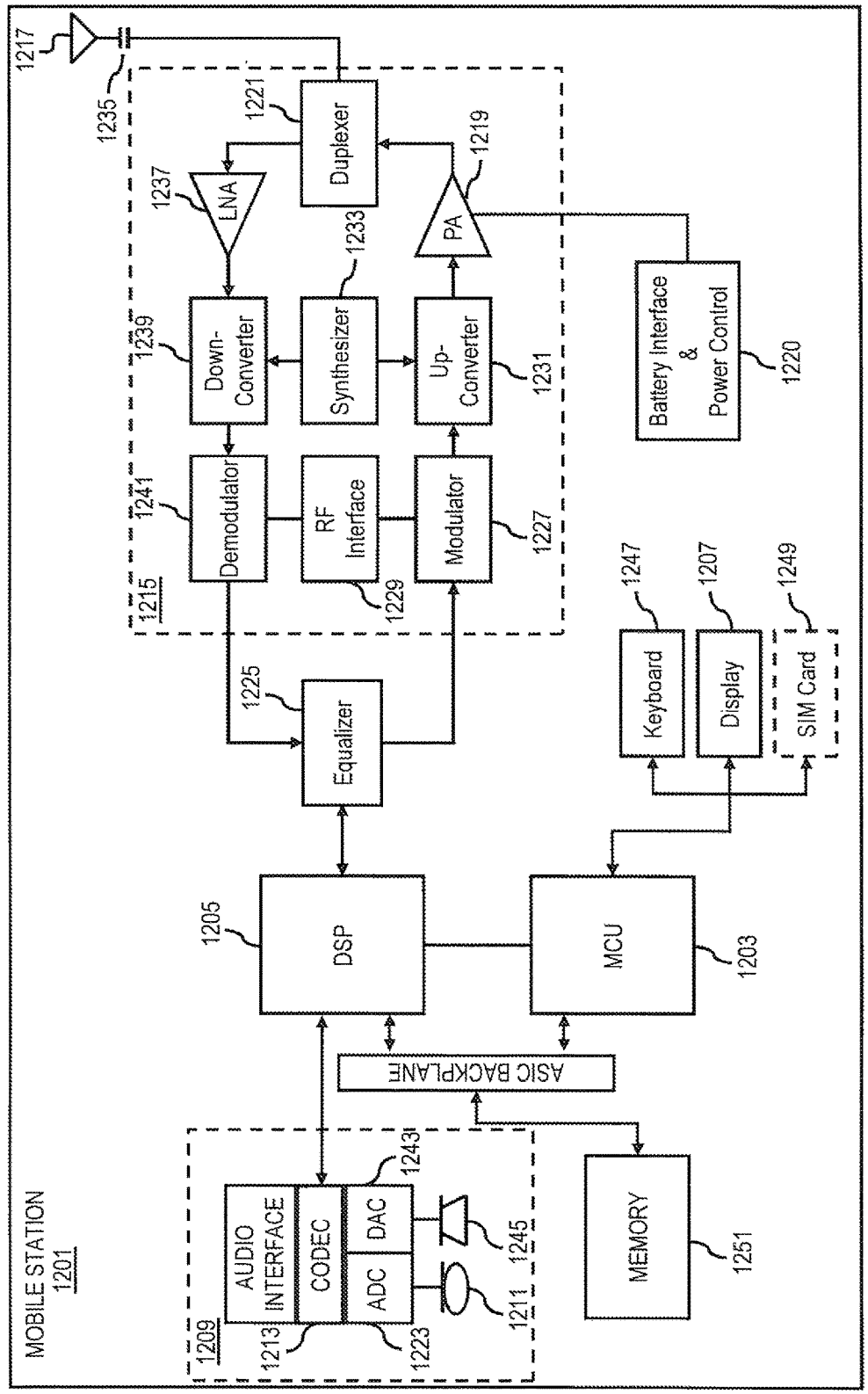
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1200, or a portion thereof, constitutes a means for performing one or more steps of providing interaction with a messaging user interface. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of interacting with a messaging user interface. The display 12 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to provide interaction with a messaging user interface. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network.

The card 1249 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    initiating, by an apparatus, a presentation of a messaging user interface associated with one or more messaging services at a device of a first user; and
    initiating, by the apparatus, a presentation of a user interface element providing a link to one or more communications sessions corresponding to a first one of the one or more messaging services,
    wherein a selection of the user interface element causes, at least in part, a presentation of one or more representations of the one or more communications sessions as one or more overlay elements on the messaging user interface, wherein each of the one or more overlay elements displays a name and a presence status of a respective second user with respect to the one or more communications sessions.

2. A method of claim 1, further comprising:
    receiving a message corresponding to one of the one or more communications sessions; and
    initiating a highlighting of one of the one or more overlay elements corresponding to the communications session based, at least in part, on a reception of the message.

3. A method of claim 1, further comprising:
    receiving a touch enabled input for selecting the user interface element;
    initiating a presentation of the one or more representations as the one or more overlay elements on the messaging user interface based, at least in part, on the touch enabled input;
    receiving another touch enabled input for selecting one of the one or more overlay elements; and
    initiating a presentation of one of the one or more communications sessions corresponding to the selected one of the one or more overlay elements.

4. A method of claim 3, wherein the selected one of the one or more overlay elements is highlighted.

5. A method of claim 1, further comprising:
    receiving a message corresponding to one of the one or more communications sessions,
        wherein the presentation of the messaging user interface is focused on the first messaging service;
    determining that the message is associated with a second one of the one or more messaging services; and
    initiating a presentation of an icon providing a link to the second messaging service, wherein the icon is, at least in part, obscured by a banner within the user interface element of the first messaging service.

6. A method of claim 5, further comprising:
    receiving a touch enabled input for selecting another user interface element; and
    initiating a presentation of another messaging interface associated with the second messaging service that displays the icon as no longer obscured by the banner within the user interface element of the first messaging service based, at least in part, on the touch enabled input.

7. A method of claim 1, wherein the one or more messaging services include a plurality of messaging services, each of the messaging services is represented by a user interface tab ordered in one line within the messaging user interface, and the method further comprising:
    in response to a receipt of a message corresponding to one of the one or more communications sessions of a second one of the one or more messaging services:
    shifting one of the tabs corresponding to the second messaging service to a center of the line, and
    surfacing a presentation of one or more other communications sessions corresponding to the second messaging service over the presentation of the one or more communications sessions corresponding to the first messaging service,
    wherein the user interface element further presents a preview of the message.

8. A method of claim 7, wherein the preview is presented corresponding to an animation of the user interface element sliding out from a portion of the messaging user interface, and wherein the preview is removed from presentation based, at least in part, on a predetermined time period.

9. An apparatus comprising:
    at least one processor; and
    at least one memory including computer program code for one or more programs,
    the at least one memory and the computer program code configured to, with the at least one processor, cause the apparatus to perform at least the following,
        initiate a presentation of a messaging user interface associated with one or more messaging services at a device of a first user; and
        initiate a presentation of a user interface element providing a link to one or more communications sessions corresponding to a first one of the one or more messaging services,
        wherein a selection of the user interface element causes, at least in part, a presentation of one or more representations of the one or more communications sessions as one or more overlay elements on the messaging user interface, wherein each of the one or more overlay elements displays a name and a presence status of a respective second user with respect to the one or more communications sessions.

10. An apparatus of claim 9, wherein the apparatus is further caused to:
    receive a message corresponding to one of the one or more communications sessions; and
    initiate a highlighting of one of the one or more overlay elements corresponding to the communications sessions based, at least in part, on a reception of the message.

11. An apparatus of claim 10, wherein the apparatus is further caused to:
    receive a touch enabled input for selecting the user interface element;
    initiate a presentation of the one or more representations as the one or more overlay elements on the messaging user interface based, at least in part, on the touch enabled input;
    receive another touch enabled input for selecting one of the one or more overlay elements; and initiate a presentation of one of the one or more communications sessions corresponding to the selected one of the one or more overlay elements.

12. An apparatus of claim 11, wherein the selected one of the one or more overlay elements is highlighted.

13. An apparatus of claim 9, wherein the apparatus is further caused to:
receive a message corresponding to one of the one or more communications sessions,
  wherein the presentation of the messaging user interface is focused on the first messaging service;
determine that the message is associated with a second one of the one or more messaging services; and
initiate a presentation of an icon providing a link to the second messaging service, wherein the icon is, at least in part, obscured by a banner within the user interface element of the first messaging service.

14. An apparatus of claim 13, wherein the apparatus is further caused to:
receive a touch enabled input for selecting another user interface element; and
initiate a presentation of another messaging interface associated with the second messaging service that displays the icon as no longer obscured by the banner within the user interface element of the first messaging service based, at least in part, on the touch enabled input.

15. An apparatus of claim 9, wherein the one or more messaging services include a plurality of messaging services, each of the messaging services is represented by a user interface tab ordered in one line within the messaging user interface, and the apparatus is further caused to:
in response to a receipt of a message corresponding to one of the one or more communications sessions of a second one of the one or more messaging services:
  shift one of the tabs corresponding to the second messaging service to a center of the line, and
  surface a presentation of one or more other communications sessions corresponding to the second messaging service over the presentation of the one or more communications sessions corresponding to the first messaging service,
wherein the user interface element further presents a preview of the message.

16. An apparatus of claim 15, wherein the preview is presented corresponding to an animation of the user interface element sliding out from a portion of the messaging user interface, and wherein the preview is removed from presentation based, at least in part, on a predetermined time period.

17. A non-transitory computer-readable storage medium carrying one or more sequences of one or more instructions which, when executed by one or more processors, cause an apparatus to at least perform the following steps:
initiating a presentation of a messaging user interface associated with one or more messaging services at a device of a first user; and
initiating a presentation of a user interface element providing a link to one or more communications sessions corresponding to a first one of the one or more messaging services,
  wherein a selection of the user interface element causes, at least in part, a presentation of one or more representations of the one or more communications sessions as one or more overlay elements on the messaging user interface, wherein each of the one or more overlay elements displays a name and a presence status of a respective second user with respect to the one or more communications sessions.

18. A non-transitory computer-readable storage medium of claim 17, wherein the apparatus is caused to further perform:
receiving a message corresponding to one of the one or more communications sessions; and
initiating a highlighting of one of the one or more overlay elements corresponding to the communications sessions based, at least in part, on a reception of the message.

19. A non-transitory computer-readable storage medium of claim 18, wherein the apparatus is caused to further perform:
receiving a touch enabled input for selecting the user interface element;
initiating a presentation of the one or more representations as the one or more overlay elements on the messaging user interface based, at least in part, on the touch enabled input;
receiving another touch enabled input for selecting one of the one or more overlay elements; and
initiating a presentation of one of the one or more communications sessions corresponding to the selected one of the one or more overlay elements.

20. A non-transitory computer-readable storage medium of claim 19, wherein the selected one of the one or more overlay elements is highlighted.

* * * * *